United States Patent
Tan et al.

(10) Patent No.: US 10,412,640 B2
(45) Date of Patent: Sep. 10, 2019

(54) SWITCHING CONTROL METHOD, APPARATUS, AND WIRELESS COMMUNICATIONS NETWORK

(71) Applicant: HUAWEI TECHNOLOGIES CO., LTD., Shenzhen (CN)

(72) Inventors: Wei Tan, Shanghai (CN); Chenghui Peng, Munich (DE); Wei Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 15/222,257

(22) Filed: Jul. 28, 2016

(65) Prior Publication Data

US 2016/0337915 A1 Nov. 17, 2016

Related U.S. Application Data

(63) Continuation of application No. PCT/CN2014/071818, filed on Jan. 29, 2014.

(51) Int. Cl.
  *H04W 24/02* (2009.01)
  *H04W 28/08* (2009.01)
  (Continued)

(52) U.S. Cl.
  CPC ......... *H04W 36/0083* (2013.01); *H04L 45/42* (2013.01); *H04W 24/02* (2013.01);
  (Continued)

(58) Field of Classification Search
  CPC ......... H04W 36/0005; H04W 36/0083; H04W 36/08; H04W 36/38; H04W 24/02; H04W 28/08
  See application file for complete search history.

(56) References Cited

U.S. PATENT DOCUMENTS

| | | | |
|---|---|---|---|
| 8,971,290 B2 * | 3/2015 | Liang | H04W 76/064 370/331 |
| 2005/0068967 A1 | 3/2005 | Terry et al. | |

(Continued)

FOREIGN PATENT DOCUMENTS

| CN | 101296404 A | 10/2008 |
|---|---|---|
| CN | 101562568 | 10/2009 |

(Continued)

OTHER PUBLICATIONS

International Search Report dated Sep. 1, 2014 in corresponding International Application No. PCT/CN2014/071818.

(Continued)

*Primary Examiner* — Lester G Kincaid
*Assistant Examiner* — Daniel G. Bassett
(74) *Attorney, Agent, or Firm* — Staas & Halsey LLP

(57) ABSTRACT

Embodiments of the present application provide a switching control method, an apparatus, and a wireless communications network. The switching control method in the present application includes: receiving a path switching request sent by a radio node (RN), and obtaining information about user equipment (UE), an identifier of a source RN, and an identifier of a destination RN according to the path switching request; determining, according to the information about the UE, the identifier of the source RN, and the identifier of the destination RN, a function node (FN) that provides a service to the destination RN, and generating a path switching rule according to the FN; sending the path switching rule to an ingress network element. The embodiments of the present application resolve a problem that when system performance is insufficient, free extension cannot be performed due to mutual restriction between multiple functions.

20 Claims, 9 Drawing Sheets

(51) Int. Cl.
*H04W 36/08* (2009.01)
*H04W 36/38* (2009.01)
*H04W 36/00* (2009.01)
*H04L 12/717* (2013.01)

(52) U.S. Cl.
CPC ..... *H04W 28/08* (2013.01); *H04W 36/00837* (2018.08); *H04W 36/08* (2013.01); *H04W 36/38* (2013.01); *H04W 36/0005* (2013.01)

(56) References Cited

U.S. PATENT DOCUMENTS

| | | | | |
|---|---|---|---|---|
| 2010/0124200 | A1* | 5/2010 | Ergen | H04W 36/0016 370/331 |
| 2011/0268086 | A1* | 11/2011 | Liang | H04W 36/0055 370/331 |
| 2013/0003697 | A1* | 1/2013 | Adjakple | H04W 36/0011 370/331 |
| 2013/0148630 | A1 | 6/2013 | Onishi et al. | |
| 2013/0157712 | A1* | 6/2013 | Park | H04W 36/18 455/525 |
| 2014/0293958 | A1* | 10/2014 | Teyeb | H04W 36/24 370/331 |
| 2014/0362775 | A1* | 12/2014 | Steiner | H04W 76/045 370/329 |
| 2015/0023176 | A1* | 1/2015 | Korja | H04W 28/065 370/236 |
| 2015/0085845 | A1* | 3/2015 | Wang | H04W 76/022 370/338 |

FOREIGN PATENT DOCUMENTS

| | | |
|---|---|---|
| CN | 101562569 | 10/2009 |
| CN | 102761919 A | 10/2012 |
| CN | 103249066 | 8/2013 |
| EP | 2 469 927 A1 | 6/2012 |
| WO | 2009/148173 | 12/2009 |
| WO | WO 2013/097900 A1 | 7/2013 |

OTHER PUBLICATIONS

Chinese Office Action dated Apr. 26, 2018 from Chinese Patent Application No. 201480044162.3, 5 pages.
Extended European Search Report dated Dec. 13, 2016 in corresponding European Patent Application No. 14881164.9.
Christopher Cox et al., "Chapter 14: Mobility Management", Introduction to LTE: LTE, LTE-Advanced, SAE and 4G Mobile Communications, John Wiley & Sons, Ltd., Oct. 18, 2012, pp. 215-230.
International Search Report dated Sep. 1, 2014 in corresponding International Patent Application No. PCT/CN2014/071818.

* cited by examiner

SWITCHING CONTROL METHOD, APPARATUS, AND WIRELESS COMMUNICATIONS NETWORK

CROSS-REFERENCE TO RELATED APPLICATIONS

This application is a continuation of International Application No. PCT/CN2014/071818, filed on Jan. 29, 2014, which is hereby incorporated by reference in its entirety.

TECHNICAL FIELD

Embodiments of the present application relate to communications technologies, and in particular, to a switching control method, an apparatus, and a wireless communications network.

BACKGROUND

Currently, with development of communications technologies, to adapt to the progress of communications standards, for each network device in an existing wireless communications network such as a mobility management entity (MME), a serving gateway (SGW), a public data network gateway (PGW), or an evolved NodeB (eNB), an increasing quantity of functions are integrated in the device.

However, multiple functions of each device are closely coupled and mutually restricted, and when system performance is insufficient, free extension cannot be performed.

SUMMARY

Embodiments of the present application provide a switching control method, an apparatus, and a wireless communications network, so as to decouple a control plane function and a user plane function of each device in a wireless communications network, so that when system performance is insufficient, free extension can be performed on the user plane function.

An embodiment of the present application provides a switching control method, including:

receiving a path switching request sent by a radio node RN, and obtaining information about user equipment UE, an identifier of a source RN, and an identifier of a destination RN according to the path switching request;

determining, according to the information about the UE, the identifier of the source RN, and the identifier of the destination RN, a function node FN that provides a service to the destination RN, and generating a path switching rule according to the FN;

sending the path switching rule to an ingress network element, so that the ingress network element adds, according to the path switching rule, the FN as a function node onto a data path of the UE, and updates locally saved data path information of the UE; and sending path switching request confirmation information to the destination RN.

According to the switching control method, the apparatus, and the wireless communications network in the embodiments of the present application, functions of each device in a switching system are decoupled to a control plane function module and a user plane function module, an MME in the existing switching system is combined with control plane function modules of an SGW and a PGW, after fine granularity splitting is performed on user plane function modules of the SGW and the PGW, the user plane function modules are deployed in a form of a function node, a centralized control network element controls, in a form of a delivery rule, the function node to provide a service to an RN and UE, to implement function independence of the switching system, and the centralized control network element can flexibly increase or decrease a quantity of function nodes, which resolves a problem that when system performance is insufficient, free extension cannot be performed due to mutual restriction between multiple functions of each device.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DESCRIPTION OF EMBODIMENTS

Figure 1:
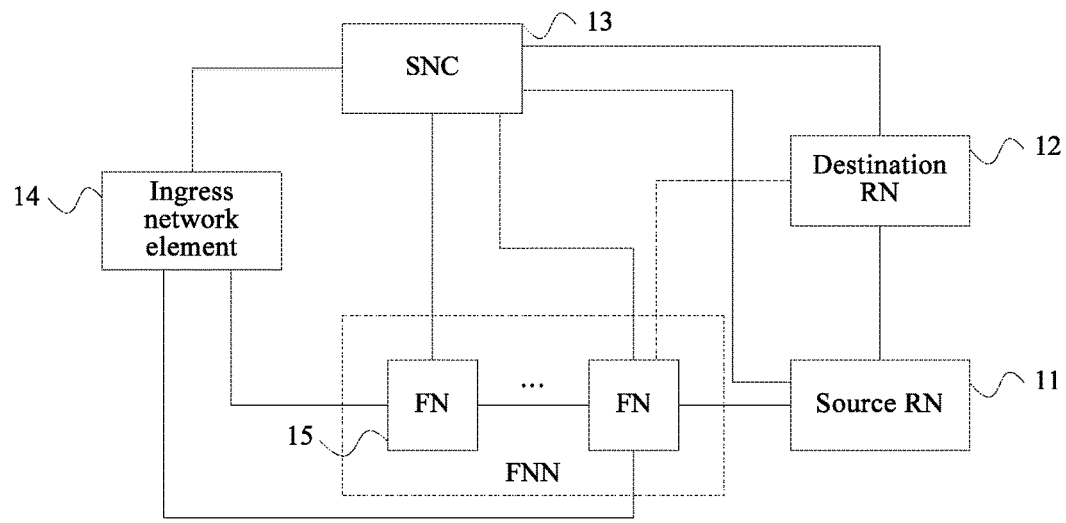
FIG. 1 is a schematic structural diagram of Embodiment 1 of a wireless communications network according to the present application.

In a 3rd Generation Partnership Project (3GPP) Long Term Evolution (LTE) protocol, a handover of user equipment between two base stations involves multiple network element devices in a network, and especially a mobility management entity (MME), a serving gateway (SGW), and a packet data node gateway (PGW in an evolved packet core (EPC) are responsible for user signaling control and data path switching in a handover process. User equipment (UE) is handed over from a source base station to a destination base station in two handover manners including a manner based on an X2 interface and a manner based on an S1 interface, and an involved handover anchor may be an SGW, or may be a PGW. The following describes existing handover implementation manners by using examples.

Method 1 is based on an X2 interface, where an SGW is unchanged.

In a handover process, user signaling and data are exchanged between a source base station and a destination base station, and a handover delay is relatively low; after UE accesses the destination base station, the destination base station instructs an MME to perform path switching. In the process, the MME is unchanged, and as a handover anchor, the SGW completes uplink/downlink data tunnel switching and possible indirect data forwarding in the handover process.

Method 2 is based on an X2 interface, where an SGW is reselected.

A difference between Method 2 and Method 1 lies in that: after UE accesses a destination base station, the destination base station instructs an MME to perform path switching, and the MME is unchanged, but the MME determines that an SGW needs to be reselected; and an Internet protocol (IP) connection exists between a destination SGW and the destination base station. When a handover occurs, the destination SGW initiates a bearer modification request to a PGW, and as a handover anchor, the PGW completes routing redirection on a user plane, and original uplink/downlink data paths are all switched. In a handover process, signaling overheads are greatly increased, and both data transmission and data path reconstruction between a source base station and the destination base station increase a handover delay of the UE.

Method 3 is based on an S1 interface.

In a handover process, data forwarding is performed between a source base station and a destination base station by using an SGW, and an original MME and an original SGW are used to perform MME reselection and SGW reselection; a destination SGW initiates a bearer modification request to a PGW, and as a handover anchor, the PGW implements a handover in an LTE system, and completes uplink/downlink data routing redirection on a user plane; and original uplink/downlink data paths are all switched. A difference between Method 3 and Method 2 lies in that Method 3 further involves MME reselection; therefore, in the handover process, signaling overheads are larger, and data transmission and data path reconstruction between the source base station and the destination base station increase a higher handover delay of UE.

In the present application, the pattern that a switching system includes a base station, an MME, an SGW, and a PGW is changed. Function division is performed on each network device, the MME and control plane functions of the SGW and the PGW are combined, user plane functions are implemented independently, an architecture of the switching system is changed, and a UE handover procedure is changed.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

FIG. 1 is a schematic structural diagram of Embodiment 1 of a wireless communications network according to the present application. As shown in FIG. 1, a system in this embodiment includes: a source radio node (RN) 11 and a destination RN 12, and in addition, further includes: a single network controller (SNC) 13, configured to perform a control management function, an ingress network element 14, configured to perform path switching rule matching, and a function node network (FNN), configured to perform a user plane function. The FNN includes at least one function node (FN) 15. The ingress network element 14 is connected to the SNC 13, the FN 15 is connected to the SNC 13, and the ingress network element 14 is connected to the FN 15. The SNC 13 is configured to increase or decrease a quantity of ingress network elements according to a load status of the ingress network element, and increase or decrease a quantity of FNs according to a load status of the FN; and the ingress network element 14 is configured to send a path switching rule to a corresponding FN, so that the corresponding FN provides a service to a destination RN according to the path switching rule.

In this embodiment, network elements such as an SGW and a PGW in an existing network are decoupled into a control plane function module and a user plane function module, the control plane function modules in the SGW and the PGW are combined with an MME to form the SNC 13, and further, fine granularity division may be performed on the user plane function module according to a function granularity, to divide the user plane function module into function modules that are more unitary to be deployed in an FNN. Each function module is implemented by at least one FN 15 correspondingly, and the SNC 13 may increase or decrease a quantity of FNs 15 according to a load status of the FN 15, without being limited by another function. The FN 15 not only can implement data forwarding of a router or a switch, but also can perform data processing. Performance of each FN is limited by a data processing capability, for example, a calculation capability, storage space, and a bandwidth. FNs may be directly connected, or may be connected by using an Internet protocol (IP) network. Data forwarding in the IP network may be implemented in a software defined network (SDN) manner, or may be implemented in a conventional autonomous manner, which is not specifically limited in this embodiment. The ingress network element 14 performs data forwarding between the SNC 13 and the FN 15, receives a path switching rule delivered by the SNC 13, performs rule matching, and then distributes the path switching rule to the FN 15. The FN 15 establishes a connection to the destination RN 12 according to the path switching rule, and provides a data path after switching to UE and performs data processing. The path switching rule may have a same processing policy, or may have different processing policies. For different processing policies, the SNC 13 needs to pre-configure the policies or deliver the policies one by one, where a data packet header needs to carry a processing policy instruction in a pre-configuration manner, and if the path switching rule has a specified parameter each time, the SNC 13 can only deliver the policies one by one.

In this embodiment, the FN 15 integrates the user plane functions of the SGW and the PGW in the existing system, and may provide a data service to the source RN 11 and the destination RN 12. When determining an FN that provides a service to the destination RN 12, the SNC 13 avoids switching as far as possible, for example, it may be that if an FN that provides a service to the source RN continues to be available, it is still determined that the FN serves the destination RN. In this way, even though the UE is handed over and accesses the destination RN, the original FN still provides a service to a data path of the UE, without a need of forwarding user context and without a need of a large quantity of signaling exchanges used for path switching, which greatly reduces a handover delay of the UE, and improves handover reliability. The SNC 13 integrates the MME and the control plane functions of the SGW and the PGW, and may centrally implement a control function in a UE handover process, which includes: collecting a status of each FN, receiving a request of each FN, and delivering a command to each FN by using an interface between the SNC 13 and the FN; by using an interface between the SNC 13 the RN, collecting a status of each RN, receiving a request of each RN, and delivering a command for adjusting a configuration of each RN; and delivering a rule, and receiving a feedback of the ingress network element 14 by using an interface between the SNC 13 and the ingress network element 14.

In this embodiment, functions of each device in a switching system are decoupled to a control plane function module and a user plane function module, an MME in the existing switching system is combined with control plane function modules of an SGW and a PGW, after fine granularity splitting is performed on user plane function modules of the SGW and the PGW, the user plane function modules are deployed in a form of a function node, a centralized control network element controls, in a form of a delivery rule, the function node to provide a service to an RN and UE, to implement function independence of the switching system, and a centralized control network element can flexibly increase or decrease a quantity of function nodes, which resolves a problem that when system performance is insufficient, free extension cannot be performed due to mutual restriction between multiple functions of each device.

Figure 2:
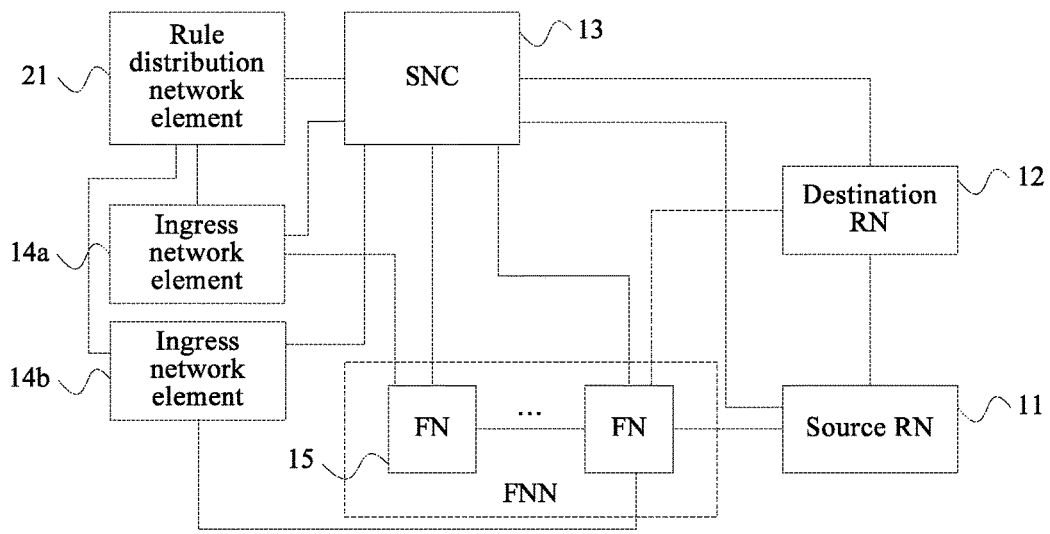
FIG. 2 is a schematic structural diagram of Embodiment 2 of a wireless communications network according to the present application.

FIG. 2 is a schematic structural diagram of Embodiment 2 of a wireless communications network according to the present application. As shown in FIG. 2, based on the structure of the switching system shown in FIG. 1, the ingress network element 14 further includes at least two ingress network elements, which, for example, may be two ingress network elements: an ingress network element 14a and an ingress network element 14b. The switching system further includes: a rule distribution network element 21, where the rule distribution network element 21 is connected to the SNC 13, the ingress network element 14a, and the ingress network element 14b. The rule distribution network element 21 is configured to perform load balancing on the at least two ingress network elements 14, and send a path switching rule to the ingress network element 14. In this embodiment, the rule distribution network element 21 performs load balancing on the ingress network element 14a and the ingress network element 14b, and sends a path switching rule to the ingress network element 14a or the ingress network element 14b.

If the switching system needs to process a large quantity of UE handover services, the SNC 13 delivers a large quantity of path switching rules. In this case, only one ingress network element 14 may not process all these rules, and the switching system may include two or more ingress network elements to process matching and forwarding of a path switching rule. In this case, the switching system further includes the rule distribution network element 21. The rule distribution network element 21 is mainly responsible for load balancing of the two or more ingress network elements, to avoid that when there are multiple ingress network elements, some ingress network elements need to process matching and forwarding of many path switching rules, and are in an overload state, while some ingress network elements have received, all the time, no path switching rule delivered by the SNC 13, and are in an idle state. In this embodiment, the path switching rule delivered by the SNC 13 is first received by the rule distribution network element 21, and the rule distribution network element 21 forwards the path switching rule to the ingress network element 14a or the ingress network element 14b according to a forwarding rule. A specific forwarding rule of the rule distribution network element 21 may be determining a forwarding object by using a priority algorithm, or may be determining a forwarding object according to received load information sent by an ingress network element, which is not specifically limited in this embodiment.

In this embodiment, the rule distribution network element in the switching system implements load balancing in multiple ingress network elements, which resolves a problem that an ingress network element is prone to a fault due to overload working.

Figure 3:
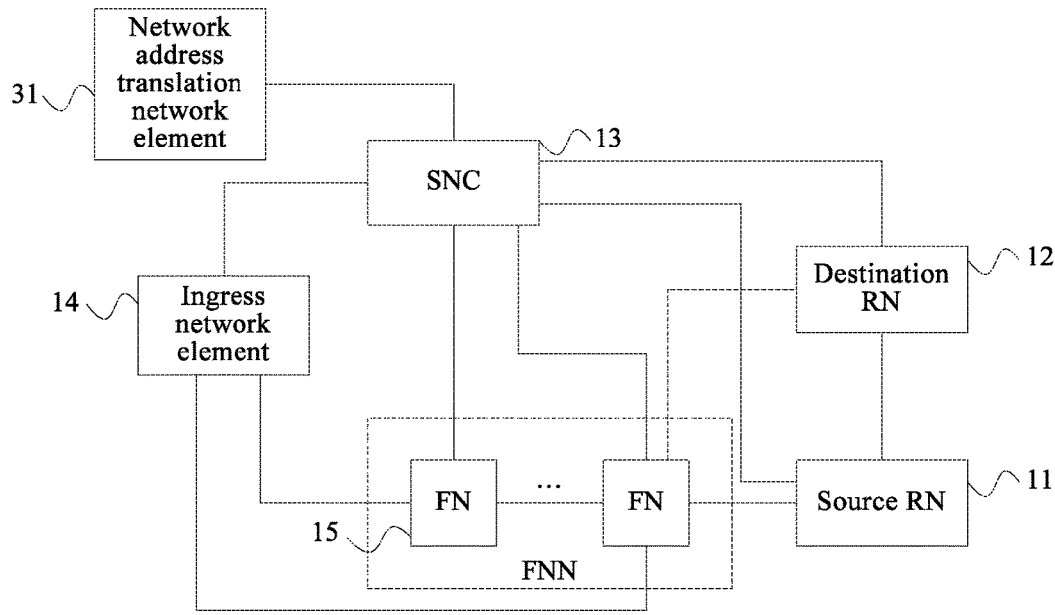
FIG. 3 is a schematic structural diagram of Embodiment 3 of a wireless communications network according to the present application.

FIG. 3 is a schematic structural diagram of Embodiment 3 of a wireless communications network according to the present application. As shown in FIG. 3, based on the structure of the switching system shown in FIG. 1, the switching system further includes: a network address translation network element 31. The network address translation network element 31 is connected to the SNC 13, and is configured to provide interfaces between networks in different domains.

In this embodiment, connections of multiple networks in different domains are implemented by using the network address translation network element in the switching system.

Figure 4:
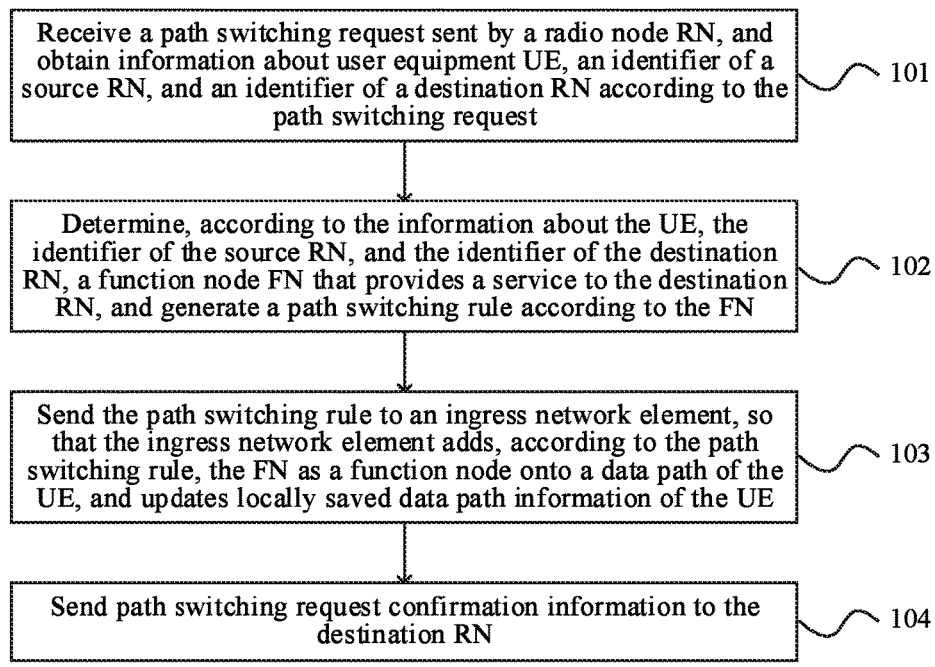
FIG. 4 is a flowchart of Embodiment 1 of a switching control method according to the present application.

FIG. 4 is a flowchart of Embodiment 1 of a switching control method according to the present application. As shown in FIG. 4, the method in this embodiment may include:

Step 101: Receive a path switching request sent by a radio node RN, and obtain information about user equipment UE, an identifier of a source RN, and an identifier of a destination RN according to the path switching request.

This embodiment may be performed by an SNC, and the SNC receives the path switching request sent by the radio node RN, and obtains the information about the user equipment UE, the identifier of the source RN, and the identifier of the destination RN according to the path switching request. Same as the prior art, movement of UE triggers a handover, after receiving handover event measurement report information of the UE, a base station starts a handover procedure, and the UE completes an attachment procedure of the UE after accessing the destination RN. However, in this case, a data path of the UE is still a path related to the source RN before the handover. In this case, the data path of the UE needs to be switched.

In this embodiment, the SNC receives the path switching request sent by the RN, where the path switching request may be sent to the SNC by the destination RN, and when a switching process is fast switching, the path switching request may be sent to the SNC by the source RN. After receiving the path switching request sent by the RN, the SNC may learn, according to the path switching request, that the UE is handed over to the destination RN, and the SNC may further obtain the information about the UE, the identifier of the source RN that the UE previously accesses, and the identifier of the destination RN that the UE currently accesses.

Step 102: Determine, according to the information about the UE, the identifier of the source RN, and the identifier of the destination RN, a function node FN that provides a service to the destination RN, and generate a path switching rule according to the FN.

In this embodiment, the SNC may obtain, according to the information about the UE, the identifier of the source RN, and the identifier of the destination RN, information about an FN that serves the source RN, to determine, by following the principle of not performing FN switching as far as possible, an FN that provides a service to the destination RN. A specific manner may be that the SNC obtains information, such as a current working state and resource use, about an FN that provides a service to the source RN; if the FN continues to be available, the SNC determines that the FN continues to provide a service to the destination RN; and if the FN is unavailable, the SNC selects another FN to provide a service to the destination RN, where the selection principle may be that a data path formed by a reselected FN can reduce a probability of occurrence of subsequent switching as far as possible. After determining the FN that provides a service to the destination RN, the SNC generates a path switching rule according to the FN, where the path switching rule may include information about the serving FN that is determined by the SNC for the destination RN, and may further include data path information after the UE is handed over, which is not specifically limited in this embodiment.

Step 103: Send the path switching rule to an ingress network element, so that the ingress network element adds, according to the path switching rule, the FN as a function node onto a data path of the UE, and updates locally saved data path information of the UE.

In this embodiment, the SNC sends the generated path switching rule to an ingress network element, so that the ingress network element adds, according to the path switching rule, the FN, determined in step 102, as a function node onto a data path of the UE, the ingress network element performs matching processing on the path switching rule generated by the SNC, and the ingress network element obtains, from the path switching rule, information about the FN that provides a service to the destination RN, and adds the FN as a function node onto the data path of the UE, that is, the ingress network element configures the FN according to the path switching rule, and instructs the FN to provide a service to the destination RN. At the same when sending the path switching rule to the ingress network element, the SNC updates the locally saved data path information of the UE, and data path information that is previously saved and is accessed to the source RN by the UE may include the information about the UE, the identifier of the source RN, and the information about the FN that provides a service to the source RN. Currently, the source RN is updated to the destination RN, and if the FN is switched, information about the FN needs to be further updated, that is, the currently updated data path information of the UE may include the information about the UE, the identifier of the destination RN, and the information about the FN that provides a service to the destination RN.

Step 104: Send path switching request confirmation information to the destination RN.

In this embodiment, the SNC sends path switching request confirmation information to the destination RN, that is, after determining that data path switching of the UE is completed, the SNC sends the path switching request confirmation information to the destination RN, and notifies the destination RN that the switching process has been completed, so that the destination RN performs a subsequent step.

In this embodiment, the SNC determines, according to the path switching request sent by the RN, by following the principle of not performing FN switching as far as possible, an FN that provides a service to the destination RN, and generates a path switching rule according to the FN, so that the data path of the UE is switched from the source RN to the destination RN according to the path switching rule, where in an entire path switching process, FN reselection is avoided as far as possible, which resolves a problem that signaling overheads of an existing switching process are large, and a switching delay is long.

Further, in step 102 in the foregoing embodiment, a specific implementation method of determining, according to the information about the UE, the identifier of the source RN, and the identifier of the destination RN, a function node FN that provides a service to the destination RN, and generating a path switching rule according to the FN may be: obtaining, according to the information about the UE, the identifier of the source RN, and the identifier of the destination RN, a first FN that provides a service to the source RN; determining, according to a load status of the first FN, whether the first FN continues to be available; and if the first FN continues to be available, determining that the first FN is the function node that provides a service to the destination RN, and generating a first path switching rule according to the first FN. In this embodiment, the SNC obtains, according to the information about the UE, the identifier of the source RN, and the identifier of the destination RN, the FN that provides a service to the source RN, and then determines, according to a load status of the FN, whether the FN may further continue to provide a service to the destination RN. The load status of the FN may be that the SNC learns, according to a processor running status of the FN, whether the FN is in an overload working state, or may be that the SNC learns, according to resource use of the FN, whether the FN is in an overload working state, which is not specifically limited in this embodiment. If the FN that provides a service to the source RN continues to be available, the SNC determines that the FN continues to provide a service to the destination RN, and generates a first path switching rule according to the FN, where content of the first path switching rule is using a same FN to process a data stream of the destination RN.

Correspondingly, in step 103 in the foregoing embodiment, a specific implementation method of sending the path switching rule to an ingress network element, so that the ingress network element adds, according to the path switching rule, the FN as a function node onto a data path of the UE, and updates locally saved data path information of the UE may be: sending the first path switching rule to the ingress network element, so that the ingress network element adds, according to the first path switching rule, the first FN as a function node onto the data path of the UE, and updates the locally saved data path information of the UE. In this embodiment, the SNC sends the first path switching rule to the ingress network element, so that the ingress network element adds, according to the first path switching rule, the FN that provides a service to the source RN, as a function node onto the data path of the UE, and the SNC updates the locally saved data path information of the UE, and updates the identifier of the source RN to the identifier of the destination RN, where the information about the FN that provides a service is unchanged.

Further, in a specific implementation method of step 102 in the foregoing embodiment, if the first FN is unavailable, an associated RN neighboring to the destination RN is obtained, a second FN that provides a service to the destination RN is selected according to a load status of an FN that provides a service to the associated RN, and a second path switching rule is generated according to the second FN. In this embodiment, the SNC determines, according to a load status of the FN that provides a service to the source RN, that the FN cannot provide a service to the destination RN any longer, and the SNC reselects an FN for the destination RN. The selection principle is that a data path formed by a reselected FN can reduce a probability of occurrence of subsequent switching as far as possible. The SNC first obtains an associated RN neighboring to the destination RN, where the SNC may obtain an RN neighboring to the destination RN according to a topology structure of the RN, and then obtain an FN that provides a service to the associated RN. There may be multiple associated RNs neighboring to the destination RN; therefore, the SNC may also obtain multiple FNs that provide a service to the associated RNs. The SNC selects, according to load statuses of these FNs, an FN that provides a service to the destination RN. A process of selecting by the SNC may be selecting an FN with minimum load from these FNs, or may be determining a current serving FN according to a priority algorithm, which is not specifically limited in this embodiment. After determining the FN that provides a service to the destination RN, the SNC generates a second path switching rule according to the FN, where content of the second path switching rule is using a second FN to process a data stream of the destination RN.

Correspondingly, in step 103 in the foregoing embodiment, a specific implementation method of sending the path switching rule to the ingress network element, so that the ingress network element adds, according to the path switching rule, the FN as a function node onto a data path of the UE, and updates locally saved data path information of the UE may be: sending the second path switching rule to the ingress network element, so that the ingress network element adds, according to the second path switching rule, the second FN as a function node onto the data path of the UE, and updates the locally saved data path information of the UE. In this embodiment, the SNC sends the second path switching rule to the ingress network element, so that the ingress network element adds, according to the second path switching rule, a reselected FN as a function node onto the data path of the UE, and the SNC updates the locally saved data path information of the UE, and updates the identifier of the source RN to the identifier of the destination RN, where the information about the FN that provides a service is updated to information about the reselected FN.

In this embodiment, an SNC determines, according to a path switching request sent by an RN, by following the principle of not performing FN switching as far as possible, an FN that provides a service to a destination RN. If the FN that provides a service to the destination RN may be an FN that provides a service to a source RN, no reselection is performed as far as possible, and if an FN needs to be reselected, it is considered that a data path formed by the reselected FN can reduce a probability of occurrence of subsequent switching as far as possible. A process of determining an FN aims at performing less switching, which resolves a problem that signaling overheads in an existing switching process are large, and a switching delay is long.

Figure 5:
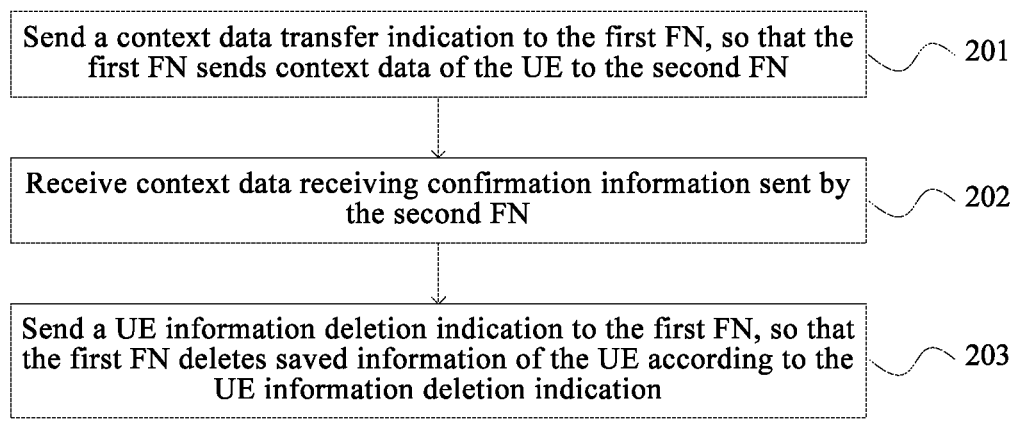
FIG. 5 is a flowchart of Embodiment 2 of a switching control method according to the present application.

FIG. 5 is a flowchart of Embodiment 2 of a switching control method according to the present application. As shown in FIG. 5, based on the method embodiment shown in FIG. 4, when the SNC determines that the first FN that provides a service to the source RN in step 102 is unavailable, the SNC needs to reselect a second FN for the destination RN, but the second FN saves no context data of the UE, so that the first FN needs to send the context data of the UE to the second FN. In the method in this embodiment, before step 103 in the foregoing embodiment, that is, send the second path switching rule to the ingress network element, so that the ingress network element adds, according to the second path switching rule, the second FN as a function node onto the data path of the UE, and updates the locally saved data path information of the UE, the SNC initiates a process in which the first FN sends the context data of the UE to the second FN. The method in this embodiment may include:

Step 201: Send a context data transfer indication to the first FN, so that the first FN sends context data of the UE to the second FN.

In this embodiment, the SNC reselects a second FN for the destination RN, and after generating a second path switching rule according to the second FN, the SNC initiates a process in which the first FN sends the context data of the UE to the second FN, and the SNC sends a context data transfer indication to the first FN, so that the first FN sends the context data of the UE to the second FN.

Step 202: Receive context data receiving confirmation information sent by the second FN.

In this embodiment, the SNC receives context data receiving confirmation information sent by the second FN, where the process occurs after the second FN receives the context data of the UE that is sent by the first FN. The first FN sends locally saved context data of the UE to the second FN according to the context data transfer indication sent by the SNC, where the context data transfer indication may include the information about the serving FN that is determined by the SNC for the destination RN, and the second FN notifies the SNC after receiving the context data of the UE.

Step 203: Send a UE information deletion indication to the first FN, so that the first FN deletes saved information of the UE according to the UE information deletion indication.

In this embodiment, the SNC sends the UE information deletion indication to the first FN, so that the first FN deletes saved information of the UE according to the UE information deletion indication. By the end of this step, the first FN no longer saves the information about the UE, that is, the first FN exits from the data path of the UE. If subsequently the first FN still needs to be used for path switching of the UE, the context data of the UE that is sent by another FN needs to be received again.

Further, before sending the path switching request confirmation information to the destination RN, the SNC receives a path switching rule configuration completion response sent by the ingress network element. The SNC sends the path switching rule to the ingress network element, and the ingress network element processes the path switching rule, but the SNC does not know a processing status of the ingress network element; therefore, the ingress network element needs to send the path switching rule configuration completion response to the SNC after processing the path switching rule completely, and the SNC performs a subsequent step according to the path switching rule configuration completion response.

Further, the process in which the first FN sends the context data of the UE to the second FN may be further initiated by the second FN. After step 103 in the foregoing embodiment, that is, send the second path switching rule to the ingress network element, so that the ingress network element adds, according to the second path switching rule, the second FN as a function node onto the data path of the UE, and updates the locally saved data path information of the UE, if the second FN receives the second path switching rule sent by the ingress network element, and then finds that no context data of the UE is locally saved, the second FN sends a context data request message to the SNC. In this case, before the foregoing step 201, the SNC receives the context data request message sent by the second FN; then the SNC sends a context data transfer indication to the first FN according to the context data request message, so that the first FN sends the context data of the UE to the second FN. Subsequent steps are similar to the foregoing step 202 and step 203, which are not described in detail herein again. A difference between the process of transferring the context data of the UE that occurs after the foregoing step 103 and the process of transferring the context data of the UE that occurs before step 103 lies in that the latter is initiated by the SNC, and the former is initiated by the second FN.

In this embodiment, the SNC or the second FN initiates the process in which the first FN sends the context data of the UE directly to the second FN, to implement fast transfer of the context data of the UE after an FN is reselected, which resolves a problem that signaling overheads in an existing switching process are large, and a switching delay is long.

Further, in a general situation of a path switching process of the UE, the path switching request received by the SNC is from the destination RN, but in a fast switching procedure, the path switching request received by the SNC is from the source RN. In this case, the SNC receives, at the beginning of path switching, a second path switching request sent by the source RN, obtains the information of the user equipment UE, the identifier of the source RN, and the identifier of the destination RN according to the second path switching request, and performs a subsequent step according to the foregoing information, and before sending path switching request confirmation information to the destination RN, the SNC needs to further receive a first path switching request sent by the destination RN.

The technical solutions in the foregoing method embodiments are described below in detail by using several specific embodiments.

Figure 6:
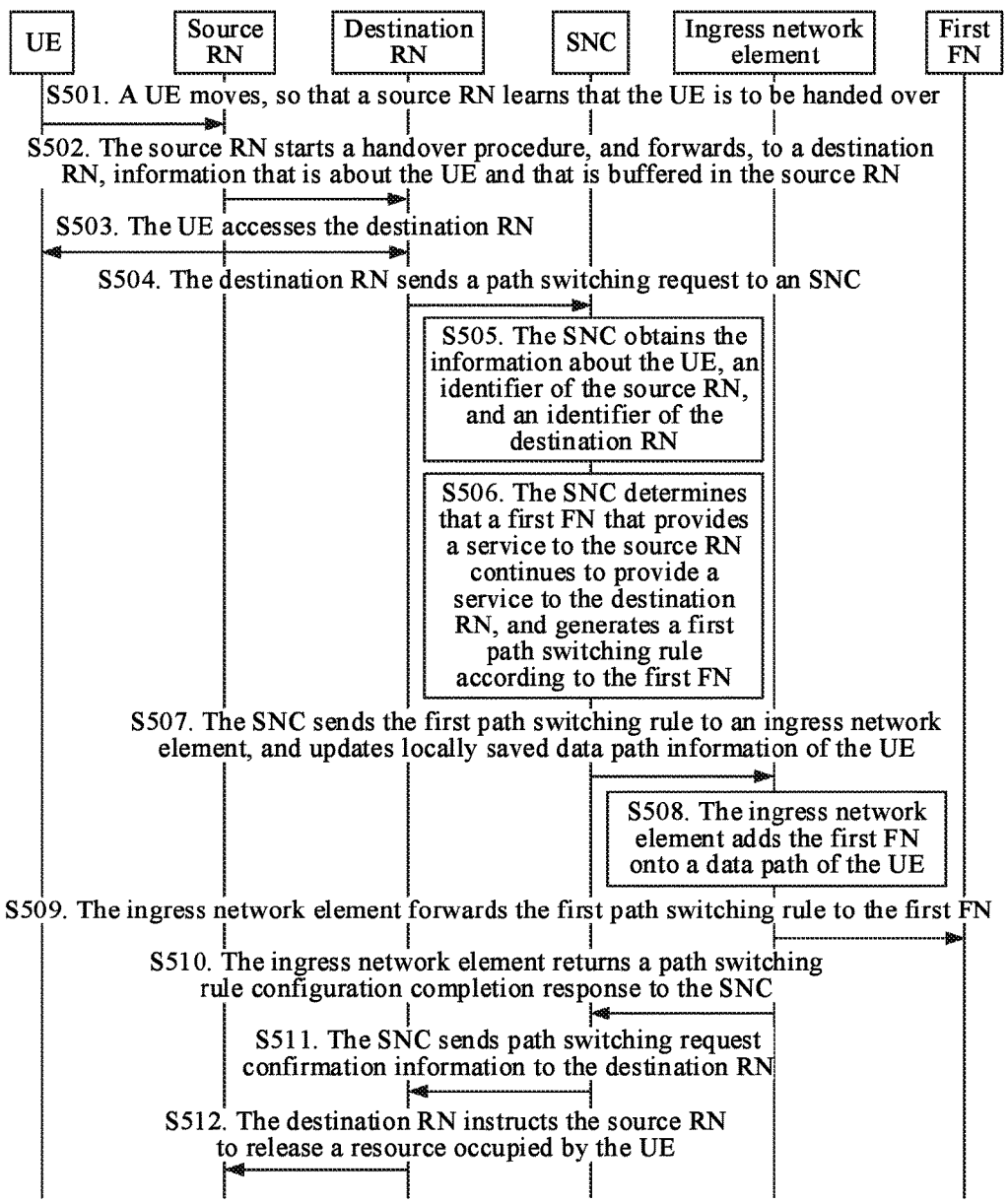
FIG. 6 is a flowchart of Embodiment 3 of a switching control method according to the present application.

FIG. 6 is a flowchart of Embodiment 3 of a switching control method according to the present application. As shown in FIG. 6, the method in this embodiment may include:

In this embodiment, a data path is unchanged after UE is handed over, and a previous FN that provides a service to a source RN is still used. A specific procedure is as follows:

S501: UE moves, so that a source RN learns that the UE is to be handed over.

In this embodiment, a position of the UE is changed, and the source RN may learn, according to measurement report information of the UE, that the UE is to be handed over.

S502: The source RN starts a handover procedure, and forwards, to a destination RN, information that is about the UE and that is buffered in the source RN.

In this embodiment, the source RN starts a handover procedure of the UE according to the pre-learned information, determines a destination RN for the UE, and sends locally saved information of the UE to the destination RN, where the information about the UE may include an identifier, the measurement report information, context data and the like that are of the UE.

S503: The UE accesses the destination RN.

In this embodiment, the process in which the UE accesses the destination RN may be a procedure similar to that in the prior art, or may be another procedure newly established by a switching system according to the present application, which is not specifically limited herein.

S504: The destination RN sends a path switching request to an SNC.

In this embodiment, the destination RN sends a path switching request to an SNC, to notify the SNC that the UE is handed over to the destination RN, and starts a data path switching process of the UE.

S505: The SNC obtains the information about the UE, an identifier of the source RN, and an identifier of the destination RN.

The process of step S505 in this embodiment is similar to the process of step 101 in the foregoing Method Embodiment 1, which is not described in detail herein again.

S506: The SNC determines that a first FN that provides a service to the source RN continues to provide a service to the destination RN, and generates a first path switching rule according to the first FN.

In this embodiment, the SNC obtains, according to the information about the UE, the identifier of the source RN, and the identifier of the destination RN, information about the first FN that provides a service to the source RN, and determines, according to a load status of the FN, that load of the first FN does not exceed a limit; and therefore, the first FN continues to be available. The SNC determines that the first FN continues to provide a service to the destination RN, and generates the first path switching rule according to the first FN, where the first path switching rule may include the identifier of the destination RN, and the information about the first FN.

S507: The SNC sends the first path switching rule to an ingress network element, and updates locally saved data path information of the UE.

The process of step S507 in this embodiment is similar to the process of step 103 in the foregoing Method Embodiment 1, which is not described in detail herein again.

S508: The ingress network element adds the first FN onto a data path of the UE.

The process of step S508 in this embodiment is similar to the process of step 302 in the foregoing Method Embodiment 3, which is not described in detail herein again.

S509: The ingress network element forwards the first path switching rule to the first FN.

S510: The ingress network element returns a path switching rule configuration completion response to the SNC.

In this embodiment, the ingress network element returns the path switching rule configuration completion response to the SNC after completely processing the path switching rule delivered by the SNC, so that the SNC performs a subsequent step.

S511: The SNC sends path switching request confirmation information to the destination RN.

The process of step S511 in this embodiment is similar to the process of step 104 in the foregoing Method Embodiment 1, which is not described in detail herein again.

S512: The destination RN instructs the source RN to release a resource occupied by the UE.

In this embodiment, after completing path switching of the UE, the destination RN instructs the source RN to release the resource of the UE. In this case, the source RN exits from the data path of the UE, and no longer processes data and signaling of the UE.

Figure 7:
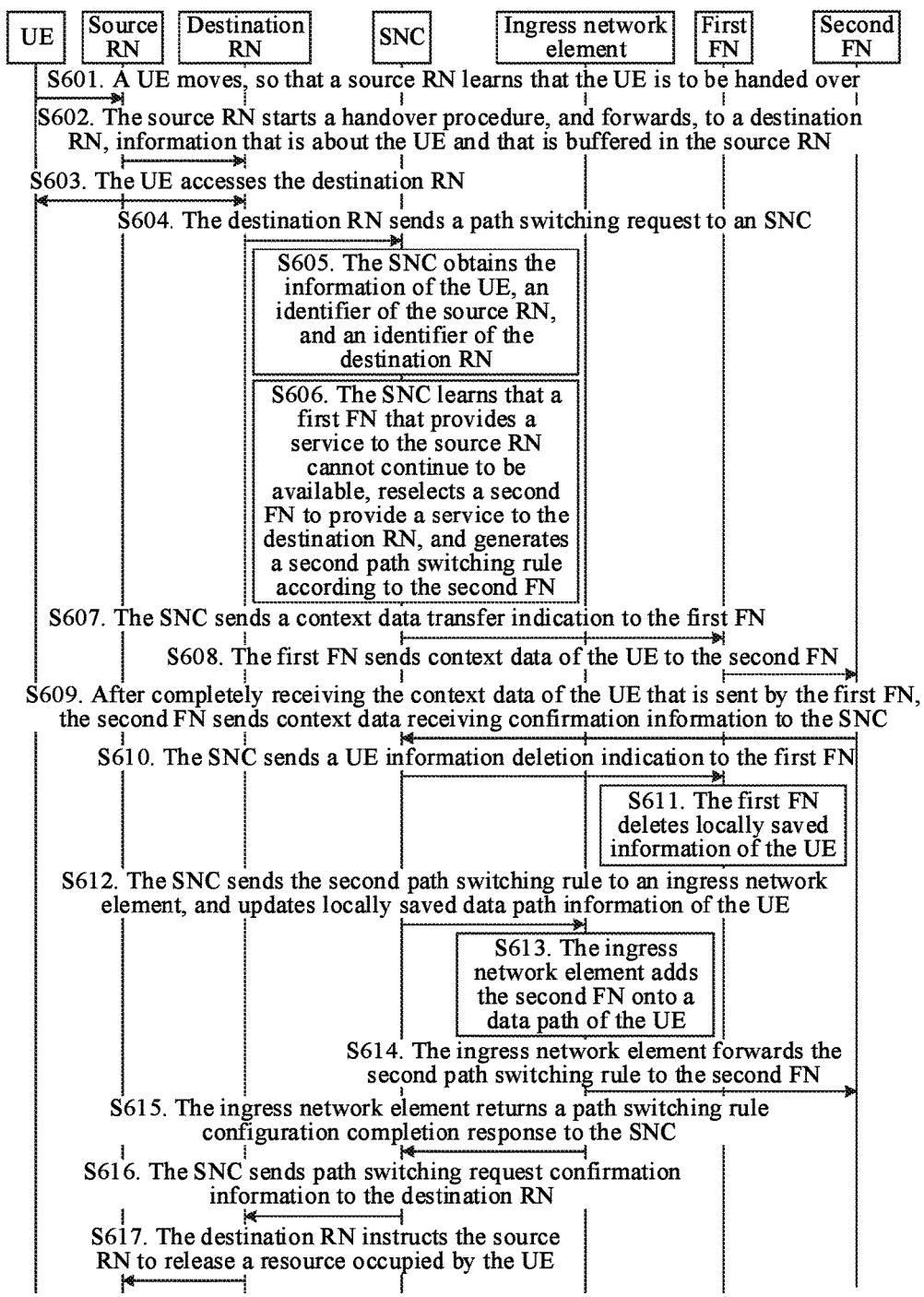
FIG. 7 is a flowchart of Embodiment 4 of a switching control method according to the present application.

FIG. 7 is a flowchart of Embodiment 4 of a switching control method according to the present application. As shown in FIG. 7, the method in this embodiment may include:

In this embodiment, a data path is changed after UE is handed over, a previous FN that provides a service to a source RN is unavailable, an FN is reselected, and an SNC triggers transfer of context information of the UE. A specific procedure is as follows:

S601: UE moves, so that a source RN learns that the UE is to be handed over.

S602: The source RN starts a handover procedure, and forwards, to a destination RN, information that is about the UE and that is buffered in the source RN.

S603: The UE accesses the destination RN.

S604: The destination RN sends a path switching request to an SNC.

S605: The SNC obtains the information about the UE, an identifier of the source RN, and an identifier of the destination RN.

S606: The SNC learns that a first FN that provides a service to the source RN cannot continue to be available, reselects a second FN to provide a service to the destination RN, and generates a second path switching rule according to the second FN.

In this embodiment, the SNC obtains, according to the information about the UE, the identifier of the source RN, and the identifier of the destination RN, information about the first FN that provides a service to the source RN, and determines, according to a load status of the FN, that the first FN is in an overload working state, and therefore, reselects another FN to provide a service to the destination RN. The selection principle may be that a data path formed by a reselected FN can reduce a probability of occurrence of subsequent switching as far as possible. A specific implementation method may be obtaining all FNs that provide a service to an associated RN neighboring to the destination RN, selecting, according to load statuses of these FNs, one FN as a second FN that provides a service to the destination RN, and generating a second path switching rule according to the second FN, where the second path switching rule may include the identifier of the destination RN, and information about the second FN.

S607: The SNC sends a context data transfer indication to the first FN.

In this embodiment, the SNC triggers transfer of the context information of the UE, and the SNC sends a context data transfer indication to the first FN, so that the first FN sends context data of the UE to the second FN, and starts a transfer procedure of the context data of the UE.

S608: The first FN sends context data of the UE to the second FN.

S609: After completely receiving the context data of the UE that is sent by the first FN, the second FN sends context data receiving confirmation information to the SNC.

S610: The SNC sends a UE information deletion indication to the first FN.

S611: The first FN deletes locally saved information of the UE.

S612: The SNC sends the second path switching rule to an ingress network element, and updates locally saved data path information of the UE.

S613: The ingress network element adds the second FN onto a data path of the UE.

S614: The ingress network element forwards the second path switching rule to the second FN.

S615: The ingress network element returns a path switching rule configuration completion response to the SNC.

S616: The SNC sends path switching request confirmation information to the destination RN.

S617: The destination RN instructs the source RN to release a resource occupied by the UE.

Figure 8:
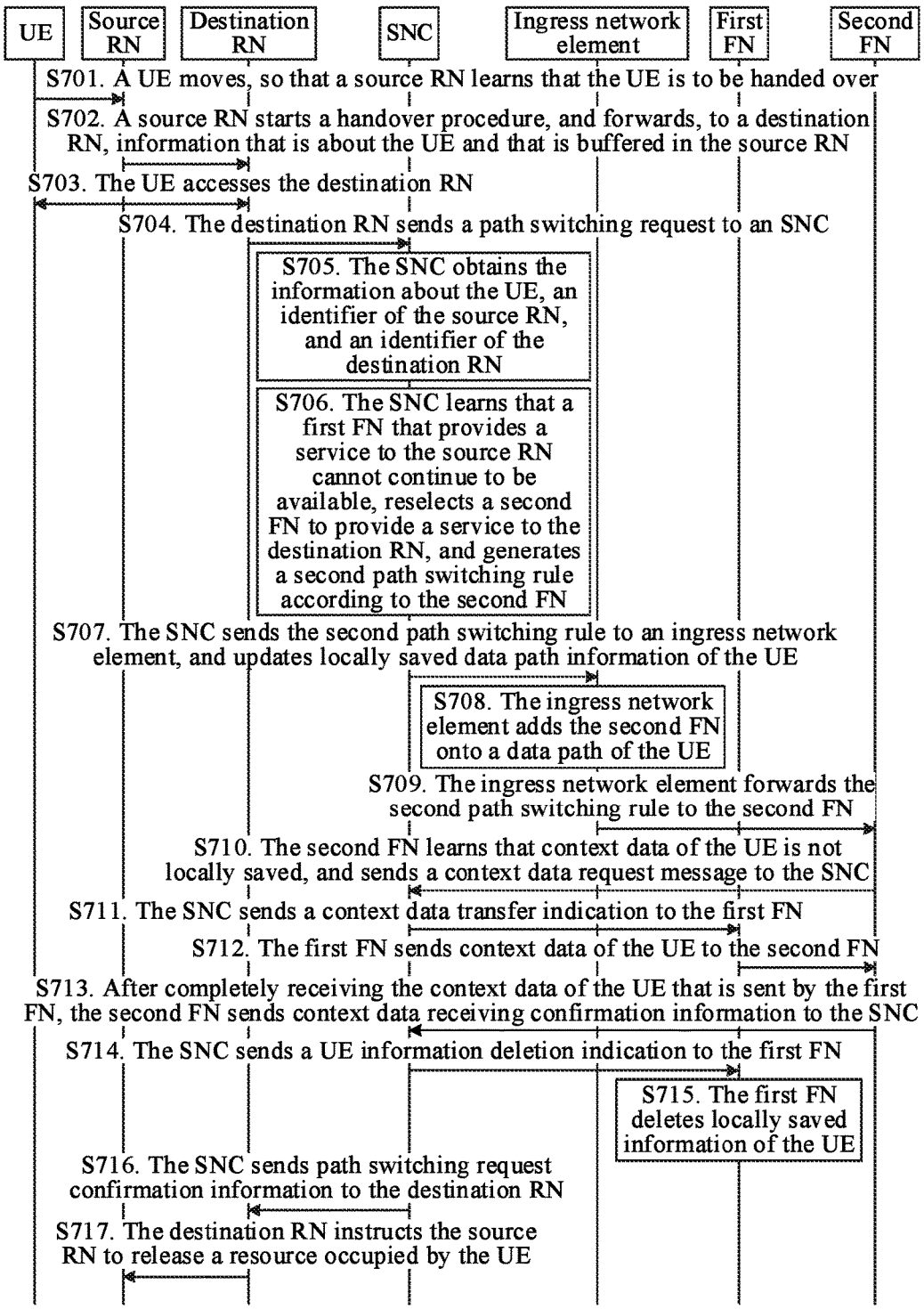
FIG. 8 is a flowchart of Embodiment 5 of a switching control method according to the present application.

FIG. 8 is a flowchart of Embodiment 5 of a switching control method according to the present application. As shown in FIG. 8, the method in this embodiment may include:

In this embodiment, a data path is changed after UE is handed over, a previous FN that provides a service to a source RN is unavailable, an FN is reselected, and a destination function node triggers transfer of context information of the UE. A specific procedure is as follows:

S701: UE moves, so that a source RN learns that the UE is to be handed over.

S702: The source RN starts a handover procedure, and forwards, to a destination RN, information that is about the UE and that is buffered in the source RN.

S703: The UE accesses the destination RN.

S704: The destination RN sends a path switching request to an SNC.

S705: The SNC obtains the information about the UE, an identifier of the source RN, and an identifier of the destination RN.

S706: The SNC learns that a first FN that provides a service to the source RN cannot continue to be available, reselects a second FN to provide a service to the destination RN, and generates a second path switching rule according to the second FN.

S707: The SNC sends the second path switching rule to an ingress network element, and updates locally saved data path information of the UE.

In this embodiment, after generating the second path switching rule, the SNC sends the second path switching rule to the ingress network element. A difference between this step and the procedure of the foregoing Method Embodiment 5 lies in that in Method Embodiment 5, after generating the second path switching rule, the SNC first starts the transfer procedure of the context information of the UE, and then sends the second path switching rule to the ingress network element.

S708: The ingress network element adds the second FN onto a data path of the UE.

S709: The ingress network element forwards the second path switching rule to the second FN.

S710: The second FN learns that context data of the UE is not locally saved, and sends a context data request message to the SNC.

In this embodiment, the second FN triggers transfer of the context information of the UE, and the second FN sends the context data request message to the SNC to start the procedure. A difference between this step and the procedure in the foregoing Method Embodiment 5 lies in that in Method Embodiment 5, transfer of the context information of the UE is triggered by the SNC.

S711: The SNC sends a context data transfer indication to the first FN.

S712: The first FN sends the context data of the UE to the second FN.

S713: After completely receiving the context data of the UE that is sent by the first FN, the second FN sends context data receiving confirmation information to the SNC.

S714: The SNC sends a UE information deletion indication to the first FN.

S715: The first FN deletes locally saved information of the UE.

S716: The SNC sends path switching request confirmation information to the destination RN.

S717: The destination RN instructs the source RN to release a resource occupied by the UE.

Figure 9:
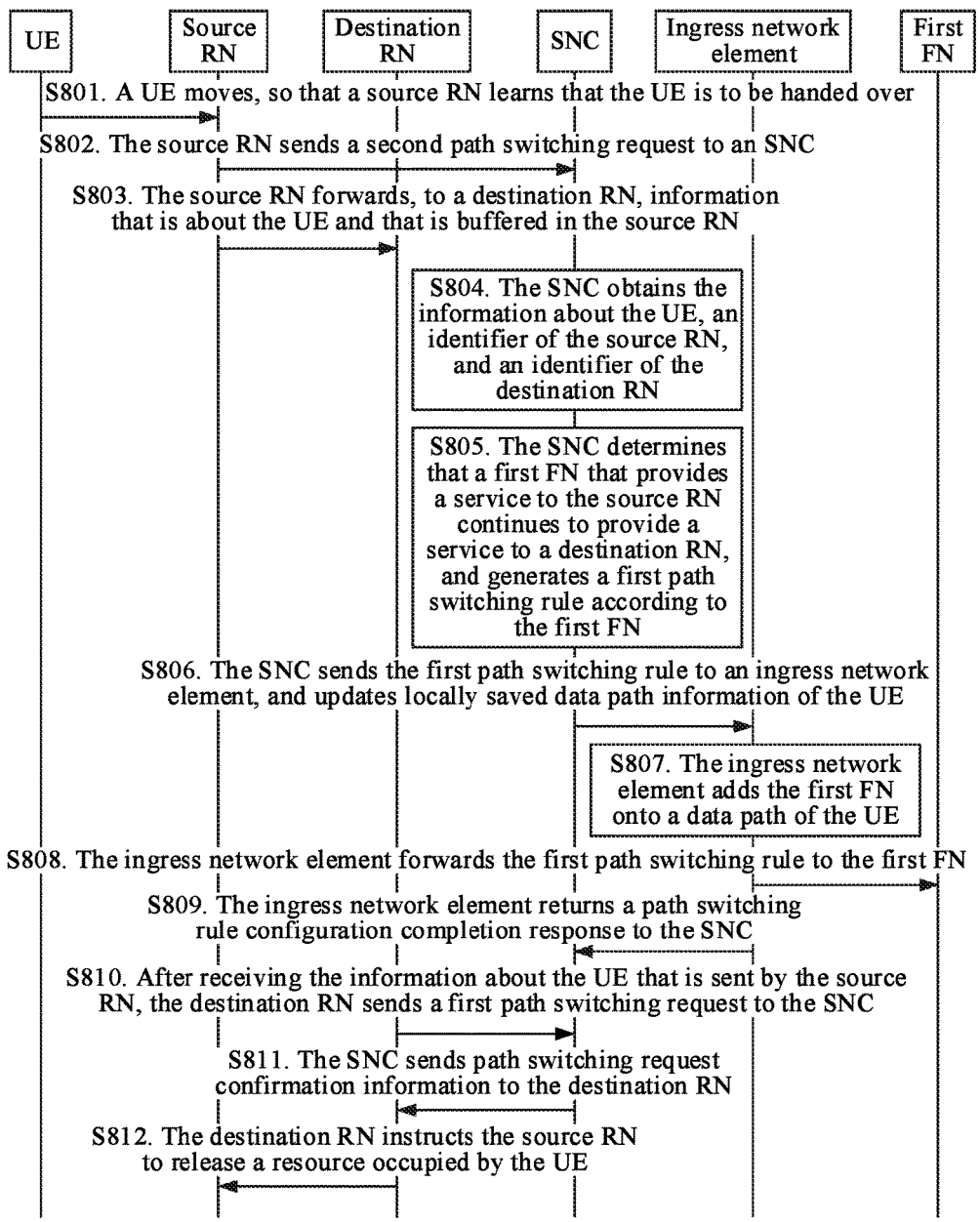
FIG. 9 is a flowchart of Embodiment 6 of a switching control method according to the present application.

FIG. 9 is a flowchart of Embodiment 6 of a switching control method according to the present application. As shown in FIG. 9, the method in this embodiment may include:

In this embodiment, by using a fast switching algorithm, a data path is unchanged after a UE is handed over, and a previous FN that provides a service to a source RN is still used. A specific procedure is as follows:

S801: UE moves, so that a source RN learns that the UE is to be handed over.

S802: The source RN sends a second path switching request to an SNC.

In this embodiment, by using the fast switching algorithm, the SNC monitors load information of each FN in real time, and when the UE is to be handed over, a serving FN may be determined for a destination RN immediately, which reduces a delay of waiting for data transmission between the source RN and the destination RN. Specifically, when learning that the UE is to be handed over, the source RN directly sends the second path switching request to the SNC, and the SNC may determine a serving FN for the destination RN in advance. A difference from the foregoing Method Embodiment 4, Method Embodiment 5, and Method Embodiment 6 lies in that in the foregoing embodiments, the UE initiates a path switching procedure only after accessing the destination RN, while in this embodiment, as long as the source RN learns that the UE is to be handed over, the source RN sends the second path switching request to the SNC, which reduces a delay of accessing the destination RN by the UE and the delay of waiting for data transmission between the source RN and the destination RN.

S803: The source RN forwards, to a destination RN, information that is about the UE and that is buffered in the source RN.

S804: The SNC obtains the information about the UE, an identifier of the source RN, and an identifier of the destination RN.

S805: The SNC determines that a first FN that provides a service to the source RN continues to provide a service to the destination RN, and generates a first path switching rule according to the first FN.

In this embodiment, the first FN that provides a service to the source RN continues to be available; therefore, the serving FN that is determined by the SNC for the destination RN is still the first FN. It should be noted that, the fast switching algorithm is also applicable to the foregoing Method Embodiment 4, Method Embodiment 5, and Method Embodiment 6, which is not specifically limited herein.

S806: The SNC sends the first path switching rule to an ingress network element, and updates locally saved data path information of the UE.

S807: The ingress network element adds the first FN onto a data path of the UE.

S808: The ingress network element forwards the first path switching rule to the first FN.

S809: The ingress network element returns a path switching rule configuration completion response to the SNC.

S810: After receiving the information about the UE that is sent by the source RN, the destination RN sends a first path switching request to the SNC.

In this embodiment, after confirming that the UE has accessed the destination RN, the destination RN sends the first path switching request to the SNC, to notify the SNC that the UE is handed over to the destination RN.

S811: The SNC sends path switching request confirmation information to the destination RN.

S812: The destination RN instructs the source RN to release a resource occupied by the UE.

Figure 10:
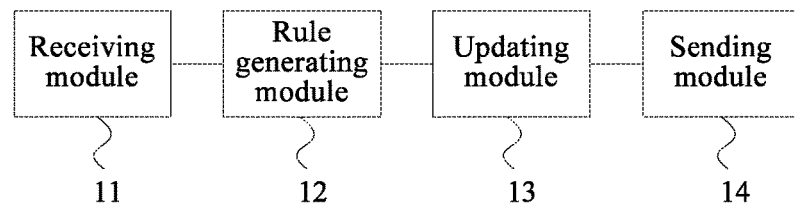
FIG. 10 is a schematic structural diagram of Embodiment 1 of an SNC according to the present application.

FIG. 10 is a schematic structural diagram of Embodiment 1 of an SNC according to the present application. As shown in FIG. 10, the apparatus in this embodiment may include: a receiving module 11, a rule generation module 12, an updating module 13, and a sending module 14. The receiving module 11 is configured to receive a path switching request sent by a radio node RN, and obtain information about user equipment UE, an identifier of a source RN, and an identifier of a destination RN according to the path switching request. The rule generation module 12 is configured to determine, according to the information about the UE, the identifier of the source RN, and the identifier of the destination RN, a function node FN that provides a service to the destination RN, and generate a path switching rule according to the FN. The updating module 13 is configured to send the path switching rule to an ingress network element, so that the ingress network element adds, according to the path switching rule, the FN as a function node onto a data path of the UE, and update locally saved data path information of the UE. The sending module 14 is configured to send path switching request confirmation information to the destination RN.

The apparatus in this embodiment may be configured to perform the technical solution in the method embodiment shown in FIG. 4, of which implementation principles and technical effects are similar, and details are not described herein again.

Figure 11:
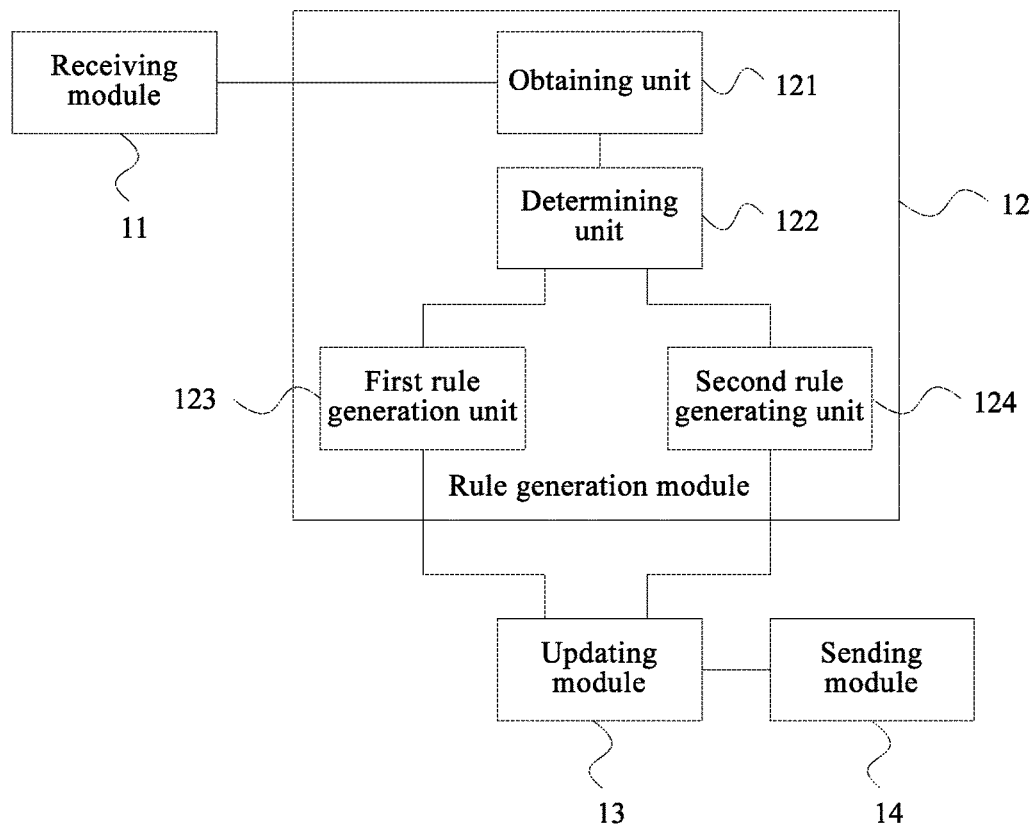
FIG. 11 is a schematic structural diagram of Embodiment 2 of an SNC according to the present application.

FIG. 11 is a schematic structural diagram of Embodiment 2 of an SNC according to the present application. As shown in FIG. 11, the apparatus in this embodiment is based on the structure of the apparatus shown in FIG. 10. Further, the rule generation module 12 may include: an obtaining unit 121, a determining unit 122, and a first rule generation unit 123. The obtaining unit 121 is configured to obtain, according to the information about the UE, the identifier of the source RN, and the identifier of the destination RN, a first FN that provides a service to the source RN. The determining unit 122 is configured to determine, according to a load status of the first FN, whether the first FN continues to be available. The first rule generation unit 123 is configured to: if the determining unit determines that the first FN continues to be available, determine that the first FN is the function node that provides a service to the destination RN, and generate a first path switching rule according to the first FN. The updating module 13 is specifically configured to send the first path switching rule to the ingress network element, so that the ingress network element adds, according to the first path switching rule, the first FN as a function node onto the data path of the UE, and updates the locally saved data path information of the UE.

As shown in FIG. 11, the rule generation module 12 may further include: a second rule generation unit 124. The second rule generation unit 124 is configured to: if the determining unit determines that the first FN is unavailable, obtain an associated RN neighboring to the destination RN, select, according to a load status of an FN that provides a service to the associated RN, a second FN that provides a service to the destination RN, and generate a second path switching rule according to the second FN. The updating module 13 is specifically configured to send the second path switching rule to the ingress network element, so that the ingress network element adds, according to the second path switching rule, the second FN as a function node onto the data path of the UE, and update the locally saved data path information of the UE.

The apparatus in this embodiment may be configured to perform the technical solution of the method embodiment shown in FIG. 4, of which implementation principles and technical effects are similar, and details are not described herein again.

Figure 12:
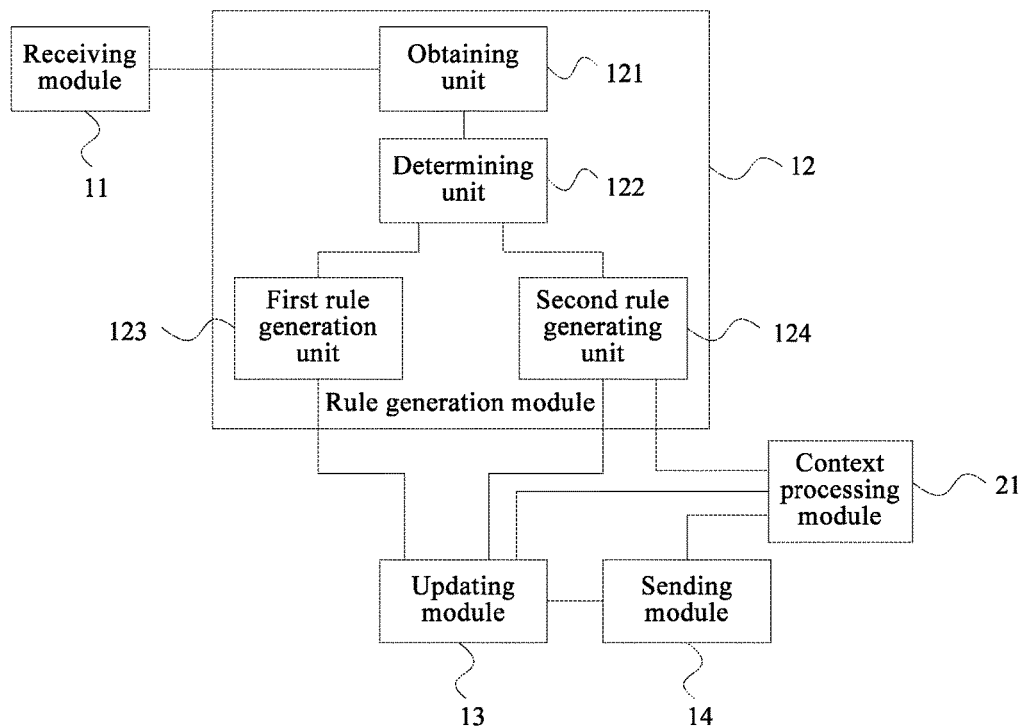
FIG. 12 is a schematic structural diagram of Embodiment 3 of an SNC according to the present application.

FIG. 12 is a schematic structural diagram of Embodiment 3 of an SNC according to the present application. As shown in FIG. 12, based on the structure of the apparatus shown in FIG. 11, the apparatus in this embodiment may further include: a context processing module 21. The context processing module 21 is configured to send a context data transfer indication to the first FN, so that the first FN sends context data of the UE to the second FN; receive context data receiving confirmation information sent by the second FN; and send a UE information deletion indication to the first FN, so that the first FN deletes saved information of the UE according to the UE information deletion indication.

The context processing module 21 is further configured to receive a context data request message sent by the second FN; send a context data transfer indication to the first FN according to the context data request message, so that the first FN sends context data of the UE to the second FN; receive context data receiving confirmation information sent by the second FN; and send a UE information deletion indication to the first FN, so that the first FN deletes saved information of the UE according to the UE information deletion indication.

The apparatus in this embodiment may be configured to perform the technical solution of the method embodiment shown in FIG. 5, of which implementation principles and technical effects are similar, and details are not described herein again.

Figure 13:
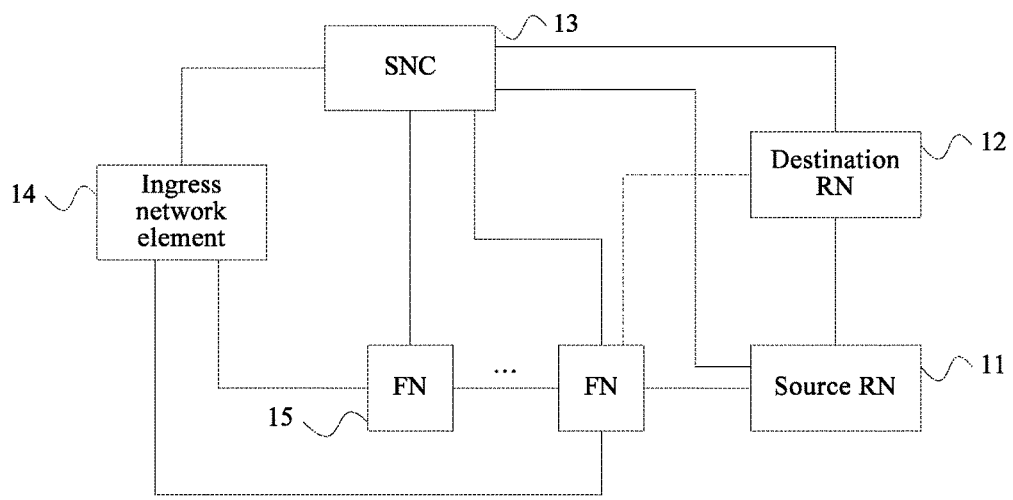
FIG. 13 is a schematic structural diagram of Embodiment 2 of a wireless communications network according to the present application.

FIG. 13 is a schematic structural diagram of Embodiment 2 of a wireless communications network according to the present application. As shown in FIG. 13, a system in this embodiment includes: a source radio node RN 11, a destination radio node RN 12, and in addition, further includes: an SNC 13, at least one ingress network element 14, and at least one FN 15. The ingress network element 14 is connected to the SNC 13, the FN 15 is connected to the SNC 13, and the ingress network element 14 is connected to the FN 15. The SNC 13 may use the structure of any one of the apparatus embodiments in FIG. 10 to FIG. 12, and correspondingly, may perform the technical solution of either of the method embodiments in FIG. 4 and FIG. 5, of which implementation principles and technical effects are similar, and details are not described herein again. The ingress network element 14 may use the structure of either of the apparatus embodiments in FIG. 16 and FIG. 17, and correspondingly, may perform the technical solution of the method embodiment in FIG. 6, of which implementation principles and technical effects are similar, and details are not described herein again. The FN 15 may use the structure of any one of the apparatus embodiments in FIG. 18 to FIG. 20, and correspondingly, may perform the technical solution of the method embodiment in FIG. 7, of which implementation principles and technical effects are similar, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is used as an example for description. In an actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A switching control method, comprising:
receiving, by a centralized control network element having a mobility management and control plane functions of a serving gateway (SGW) and a packet data node gateway (PGW), a path switching request from a radio node (RN), and obtaining information about user equipment (UE), an identifier of a source RN, an identifier of a destination RN according to the path switching request, and information about a first function node (FN) that provides a service to the source RN;
according to the obtained information about the UE, the identifier of the source RN, the identifier of the destination RN, and the information about the first FN, determining, by the centralized control network element, whether the first FN or a second FN, each of which has user plane functions of the SGW and the PGW, is to be selected to provide a service to the destination RN, and generating by the centralized control network element a path switching rule that selects one of the first FN and the second FN to provide the service to the destination RN;

sending, by the centralized control network element, the path switching rule to an ingress network element that is a separate network element connected to the centralized control network element, the first FN, and the second FN, and which is configured to add, according to the path switching rule, the one of the first FN and the second FN as a function node onto a data path of the UE, and to update locally saved data path information of the UE; and sending, by the centralized control network element, path switching request confirmation information to the destination RN.

2. The method according to claim 1, wherein the determining, by the centralized control network element, whether the first FN or the second FN should provide the service to the destination RN, comprises:

determining, according to a load status of the first FN, whether the first FN continues to be available; and if the first FN continues to be available, determining that the first FN is the function node that provides the service to the destination RN, and generating the path switching rule that selects the first FN to provide the service to the destination RN.

3. The method according to claim 2, wherein the centralized control network element sends the path switching rule to the ingress network element, so that the ingress network element adds, according to the path switching rule, the first FN as the function node onto the data path of the UE, and updates the locally saved data path information of the UE.

4. The method according to claim 2, wherein a plurality of function nodes respectively provide a service to a plurality of associated RNs neighboring the destination RN, and the method further comprises:

if the first FN is unavailable, selecting as the second FN a function node from among the plurality of function nodes which has a lowest load status, and generating the path switching rule that selects the second FN to provide the service to the destination RN.

5. The method according to claim 4, wherein the centralized control network element sends the path switching rule to the ingress network element so that the ingress network element adds, according to the path switching rule, the second FN as the function node onto the data path of the UE, and updates the locally saved data path information of the UE.

6. The method according to claim 2, further comprising:

if the first FN is unavailable, selecting the second FN to provide the service to the destination RN, and generating the path switching rule that selects the second FN to provide the service to the destination RN;

sending, by the centralized control network element, the path switching rule to the ingress network element so that the ingress network element adds, according to the path switching rule, the second FN as the function node onto the data path of the UE, and updates the locally saved data path information of the UE;

in response to selecting the second FN as the function node, sending, by the centralized control network element, a context data transfer indication to the first FN so that the first FN sends context data of the UE to the second FN;

receiving, by the centralized control network element, context data receiving confirmation information from the second FN after the second FN receives the context data of the UE from the first FN; and sending, by the centralized control network element, a UE information deletion indication to the first FN so that the first FN deletes saved information of the UE according to the UE information deletion indication.

7. The method according to claim 2, further comprising:

if the first FN is unavailable, selecting the second FN to provide the service to the destination RN, and generating the path switching rule that selects the second FN to provide the service to the destination RN;

sending, by the centralized control network element, the path switching rule to the ingress network element so that the ingress network element adds, according to the path switching rule, the second FN as the function node onto the data path of the UE, and updates the locally saved data path information of the UE;

receiving, by the centralized control network element, a context data request message sent from the second FN which requests context data of the UE;

in response to receiving the context data request message, sending a context data transfer indication to the first FN according to the context data request message so that the first FN sends context data of the UE to the second FN;

receiving, by the centralized control network element, context data receiving confirmation information sent from the second FN after the second FN receives the context data of the UE from the first FN; and sending, by the centralized control network element, a UE information deletion indication to the first FN so that the first FN deletes saved information of the UE according to the UE information deletion indication.

8. The method according to claim 2, further comprising: receiving a path switching rule configuration completion response from the ingress network element.

9. The method according to claim 1, wherein the path switching request is sent from the destination RN after the UE has been handed over to the destination RN.

10. The method according to claim 1, wherein the path switching request is sent from the source RN upon learning that the UE is to be handed over to the destination RN.

11. The method according to claim 10, before the sending by the centralized control network element path switching request confirmation information to the destination RN, further comprising:

receiving another path switching request sent from the destination RN after the UE has been handed over to the destination RN.

12. A single network controller (SNC), comprising:

a processor; and a non-transitory computer-readable storage medium coupled to the processor and storing programming modules for execution by the processor, the programming modules including:

a receiving module, configured to receive a path switching request sent by a radio node (RN), and obtain information about user equipment (UE), an identifier of a source RN, an identifier of a destination RN according to the path switching request, and information about a first function node (FN) that provides a service to the source RN;

a rule generation module, configured to determine, according to the obtained information about the UE, the identifier of the source RN, the identifier of the destination RN, and the information about the first FN, whether the first FN or a second FN, each of which is connected to the SNC and has user plane functions of a serving gateway (SGW) and a packet data node gateway (PGW), is to be selected to provide a service to the destination RN, and to generate a path switching rule that selects one of the first FN and the second FN to provide the service to the destination RN;

an updating module configured to send the path switching rule to an ingress network element which is a separate network element connected to the SNC, the first FN, and the second FN, the ingress network element being configured to add, according to the path switching rule, the one of the first FN and the second FN as a function node onto a data path of the UE, and to update locally saved data path information of the UE; and a sending module, configured to send path switching request confirmation information to the destination RN, wherein the SNC has a mobility management and control plane functions of the SGW and the PGW.

13. The SNC according to claim 12, wherein the rule generation module comprises:
a determining unit, configured to determine, according to a load status of the first FN, whether the first FN continues to be available; and
a first rule generation unit, configured to: if the determining unit determines that the first FN continues to be available, determine that the first FN is the function node that provides the service to the destination RN, and generate the path switching rule according that selects the first FN to provide the service to the destination RN.

14. The SNC according to claim 13, wherein the updating module is configured to send the path switching rule to the ingress network element, so that the ingress network element adds, according to the path switching rule, the first FN as the function node onto the data path of the UE, and updates the locally saved data path information of the UE.

15. The SNC according to claim 13, wherein:
a plurality of function nodes respectively provide a service to a plurality of associated RNs neighboring the destination RN, and
the rule generation module further comprises:
a second rule generation unit, configured to: if the determining unit determines that the first FN is unavailable, select as the second FN a function node from among the plurality of function nodes which has a lowest load status, and to generate the path switching rule that selects the second FN to provide the service to the destination RN.

16. The SNC according to claim 15, wherein the updating module is configured to send the path switching rule to the ingress network element so that the ingress network element adds, according to the path switching rule, the second FN as the function node onto the data path of the UE, and updates the locally saved data path information of the UE.

17. The SNC according to claim 16, further comprising:
a context processing module, configured to:
in response to selection of the second FN as the function node, send a context data transfer indication to the first FN, so that the first FN sends context data of the UE to the second FN;
receive context data receiving confirmation information from the second FN after the second FN receives the context data of the UE from the first FN; and
send a UE information deletion indication to the first FN, so that the first FN deletes saved information of the UE according to the UE information deletion indication.

18. The SNC according to claim 16, further comprising:
a context processing module, configured to:
receive a context data request message sent from the second FN which requests context data of the UE;
in response to receiving the context data request message, send a context data transfer indication to the first FN according to the context data request message, so that the first FN sends context data of the UE to the second FN;
receive context data receiving confirmation information from the second FN after the second FN receives the context data of the UE from the first FN; and
send a UE information deletion indication to the first FN, so that the first FN deletes saved information of the UE according to the UE information deletion indication.

19. A network device, comprising:
a processor; and
a non-transitory computer-readable storage medium coupled to the processor and storing programming instructions for execution by the processor, the programming instructions instruct the processor to:
receive a path switching request sent by a radio node (RN), and obtain information about user equipment (UE), an identifier of a source RN, an identifier of a destination RN according to the path switching request, and information about a first function node (FN) that provides a service to the source RN;
determine, according to the obtained information about the UE, the identifier of the source RN, the identifier of the destination RN, and the information about the first FN, whether the first FN or a second FN, each of which is connected to the network device and has user plane functions of a serving gateway (SGW) and a packet data node gateway (PGW), is to be selected to provide a service to the destination RN, and to generate a path switching rule that selects one of the first FN and the second FN to provide the service to the destination RN;
send the path switching rule to an ingress network element which is a separate network element connected to the network device, the first FN, and the second FN, the ingress network element being configured to add, according to the path switching rule, the one of the first FN and the second FN as a function node onto a data path of the UE, and to update locally saved data path information of the UE; and
send path switching request confirmation information to the destination RN,
wherein the network device has a mobility management function and control plane functions of the SGW and PGW.

20. A wireless communications network, comprising:
a source radio node (RN);
a destination RN;
a single network controller (SNC) that integrates a mobility management entity (MME) and control plane functions of a serving gateway (SGW) and a packet data node gateway (PGW), configured to receive a path switching request from one of the source RN and the destination RN, and to obtain information about user equipment (UE), an identifier of the source RN, an identifier of the destination RN, and information about a first function node (FN) that provides a service to the source RN;

at least two function nodes (FNs) in communication connection with the SNC, the at least two FNs including the first FN and a second FN, each of the first FN and the second FN having user plane functions of the SGW and the PGW; and at least one ingress network element in communication connection with the SNC, and in communication connection with the at least two FNs, the ingress network element configured to:
    receive, from the SNC, a path switching rule which selects one of the first FN and the second FN to provide a service to the destination RN,
    add, according to the path switching rule, one of the first FN and the second FN as a function node onto a data path of the UE, and
    update locally saved data path information of the UE, wherein the SNC is configured to generate the path switching rule by determining whether the first FN or the second FN is to be selected to provide the service to the destination RN according to the obtained information about the UE, the identifier of the source RN, the identifier of the destination RN, and the information about the first FN.

* * * * *

UNITED STATES PATENT AND TRADEMARK OFFICE
CERTIFICATE OF CORRECTION

PATENT NO. : 10,412,640 B2  
APPLICATION NO. : 15/222257  
DATED : September 10, 2019  
INVENTOR(S) : Wei Tan et al.

Page 1 of 1

It is certified that error appears in the above-identified patent and that said Letters Patent is hereby corrected as shown below:

In the Claims

Column 21, Line 37, In Claim 13, after "path switching rule" delete "according".

Signed and Sealed this  
Seventh Day of January, 2020

Andrei Iancu  
*Director of the United States Patent and Trademark Office*